(12) United States Patent
Cheng et al.

(10) Patent No.: US 10,708,068 B2
(45) Date of Patent: *Jul. 7, 2020

(54) SYSTEM AND METHOD FOR IMPLEMENTING BLOCKCHAIN-BASED DIGITAL CERTIFICATES

(71) Applicant: ALIBABA GROUP HOLDING LIMITED, Grand Cayman (KY)

(72) Inventors: Long Cheng, Hangzhou (CN); Yanpeng Li, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/472,752

(22) PCT Filed: Feb. 28, 2019

(86) PCT No.: PCT/CN2019/076485
§ 371 (c)(1),
(2) Date: Jun. 21, 2019

(87) PCT Pub. No.: WO2019/101227
PCT Pub. Date: May 31, 2019

(65) Prior Publication Data
US 2019/0319806 A1    Oct. 17, 2019

(51) Int. Cl.
*H04L 29/06* (2006.01)
*G06Q 20/38* (2012.01)
(Continued)

(52) U.S. Cl.
CPC ........ *H04L 9/3263* (2013.01); *G06F 16/2308* (2019.01); *H04L 9/3239* (2013.01); *H04L 9/3247* (2013.01)

(58) Field of Classification Search
None
See application file for complete search history.

(56) References Cited

U.S. PATENT DOCUMENTS 9,849,364 B2   12/2017  Tran et al.
9,853,819 B2   12/2017  Truu et al.
(Continued)

FOREIGN PATENT DOCUMENTS

CN    107316239 A    11/2017
CN    108537556 A    9/2018
(Continued)

OTHER PUBLICATIONS

Written Opinion of the International Searching Authority and International Search Report for PCT Application No. PCT/CN2019/076476 dated Nov. 21, 2019 (8 pages).
(Continued)

*Primary Examiner* — Fatoumata Traore

(57) ABSTRACT

Methods, systems, and apparatus, including computer programs encoded on computer storage media, for implementing digital certificates. One of the methods includes: generating a digital certificate; generating a digital abstract of the digital certificate; transmitting the digital abstract of the digital certificate to one or more nodes of a blockchain for storage in the blockchain; obtaining a transaction identification associated with storing the digital abstract of the digital certificate in the blockchain; and associating a digital mark with the transaction identification.

20 Claims, 10 Drawing Sheets

(51) Int. Cl.
*H04L 9/32* (2006.01)
*G06F 16/23* (2019.01)

(56) References Cited

U.S. PATENT DOCUMENTS

| | | | |
|---|---|---|---|
| 9,998,286 | B1 | 6/2018 | Ramathal et al. |
| 10,102,526 | B1* | 10/2018 | Madisetti .............. H04L 9/3239 |
| 10,243,748 | B1 | 3/2019 | Callan et al. |
| 10,320,569 | B1 | 6/2019 | Wentz et al. |
| 10,547,457 | B1 | 1/2020 | Duccini et al. |
| 2017/0180134 | A1 | 6/2017 | King |
| 2017/0300898 | A1* | 10/2017 | Campero .............. H04L 9/3236 |
| 2018/0060496 | A1 | 3/2018 | Bulleit et al. |
| 2018/0082256 | A1 | 3/2018 | Tummuru et al. |
| 2018/0101701 | A1 | 4/2018 | Barinov et al. |
| 2018/0227130 | A1 | 8/2018 | Ebrahimi et al. |
| 2018/0227131 | A1* | 8/2018 | Ebrahimi ........... G06Q 20/3827 |
| 2018/0241573 | A1 | 8/2018 | Ramathal et al. |
| 2019/0132138 | A1 | 5/2019 | Finlow-bates et al. |
| 2019/0140844 | A1 | 5/2019 | Brown et al. |
| 2019/0173872 | A1 | 6/2019 | Arora et al. |
| 2019/0182042 | A1 | 6/2019 | Ebrahimi et al. |
| 2019/0205894 | A1 | 7/2019 | Gonzales, Jr. et al. |
| 2019/0319948 | A1 | 10/2019 | Triola et al. |
| 2019/0327094 | A1 | 10/2019 | Kan et al. |
| 2019/0363896 | A1 | 11/2019 | Finlow-bates |
| 2019/0394052 | A1 | 12/2019 | Li et al. |
| 2020/0021446 | A1 | 1/2020 | Roennow et al. |

FOREIGN PATENT DOCUMENTS

| | | |
|---|---|---|
| CN | 108768657 A | 11/2018 |
| CN | 108810895 A | 11/2018 |
| CN | 109064120 A | 12/2018 |
| WO | 2018/06956 A1 | 4/2018 |
| WO | 2018114587 A1 | 6/2018 |
| WO | 2018115992 A1 | 6/2018 |
| WO | 2018145127 A1 | 8/2018 |
| WO | 2018223125 A1 | 12/2018 |

OTHER PUBLICATIONS

Written Opinion of the International Searching Authority and International Search Report for PCT Application No. PCT/CN2019/076485 dated Dec. 2, 2019 (7 pages).

Search Report for European Application No. 19725885.8 dated Apr. 2, 2020.

Preinterview first office action for U.S. Appl. No. 16/738,155 dated Apr. 13, 2020.

First action interview—office action for U.S. Appl. No. 16/738,195 dated Apr. 6, 2020.

Preinterview first office action for U.S. Appl. No. 16/738,195 dated Mar. 10, 2020.

* cited by examiner

SYSTEM AND METHOD FOR IMPLEMENTING BLOCKCHAIN-BASED DIGITAL CERTIFICATES

CROSS REFERENCE TO RELATED APPLICATION

This application is a national phase application of International Application No. PCT/CN2019/076485, filed on Feb. 28, 2019, the contents of which are incorporated by reference in its entirety.

TECHNICAL FIELD

This application generally relates to methods and devices for implementing blockchain-based digital certificates.

BACKGROUND

Certificates can provide evidence or proof for economic transactions or other activities and may serve certain legal ends. For traditional exchanges, certificates are paper-based and endorsed by rubber-ink seals or signatures. In one example, a corporate seal or signature represents the associated enterprise as officially registered. However, paper certificates can be easily lost or damaged. In response to that, digital certificates are gradually replacing paper-based certificates to overcome such disadvantages. Nevertheless, digital certificates are easier to copy or otherwise falsify than the paper certificates. In current technologies, digital certificates are often implemented as digital images or pdf renderings of the physical certificates. Such digital certificates are susceptible to tampering or other unauthorized alteration. As a result, despite providing certain conveniences over paper certificates, current digital certificates cannot ensure security and often diminish or lose their effect as legal evidence. It is therefore desirable to have secure and tamper-proof digital certificates.

SUMMARY

Various embodiments of the specification include, but are not limited to, systems, methods, and non-transitory computer readable media for implementing blockchain-based digital certificates.

According to one aspect, a computer-implemented method for implementing digital certificates comprises: generating a digital certificate; generating a digital abstract of the digital certificate; transmitting the digital abstract of the digital certificate to one or more nodes of a blockchain for storage in the blockchain; obtaining a transaction identification associated with storing the digital abstract of the digital certificate in the blockchain; and associating a digital mark with the transaction identification.

In some embodiments, the digital mark is associated with an entity. The digital mark is associated with another transaction identification associated with storing entity information of the entity in the blockchain.

In other embodiments, associating the digital mark with the transaction identification shows endorsement by the entity.

In some embodiments, the digital mark comprises at least one of a digital seal or a digital signature. In one embodiment, the digital mark comprises a digital seal. In another embodiment, the digital mark comprises a digital signature. The digital mark is associated with endorsement by an entity. When associated with the digital mark, the digital certificate is associated with the digital mark and endorsed by the entity.

In other embodiments, transmitting the digital abstract of the digital certificate to the one or more nodes of the one or more nodes for storage in the blockchain comprises: writing the digital abstract of the digital certificate and a cryptographic process used for generating the digital abstract into a blockchain contract; and causing the one or more nodes to initiate a blockchain transaction to deploy the blockchain contact.

In still other embodiments, the digital abstract comprises a hash value of the digital certificate; and the transaction identification comprises a hash value of the blockchain transaction.

In yet other embodiments, associating the digital mark with the transaction identification comprises: associating the digital mark, the transaction identification, and the digital abstract.

In some embodiments, generating the digital certificate comprises: obtaining contents of the digital certificate from an entity, the entity being a corporation; and generating the digital certificate comprising the contents.

In other embodiments, the method further comprises: transmitting an association relationship between the digital mark and the transaction identification to the one or more nodes for storage in the blockchain.

In still other embodiments, the method further comprises: in response to a verification request for an unverified digital certificate endorsed by an unverified digital mark, obtaining a transaction identification corresponding to the unverified digital certificate; according to the transaction identification corresponding to the unverified digital certificate, obtaining a blockchain-stored digital abstract and a blockchain-stored digital mark; generating a digital abstract of the unverified digital certificate according to a cryptographic process used for generating the digital abstract of the digital certificate; verifying if the blockchain-stored digital abstract is consistent with the digital abstract of the unverified digital certificate and if the blockchain-stored digital mark is consistent with the unverified digital mark; and in response to determining that the blockchain-stored digital abstract is consistent with the digital abstract of the unverified digital certificate and the blockchain-stored digital mark is consistent with the unverified digital mark, determining that the unverified digital certificate is authentic.

In some embodiments, a digital certificate system comprises: one or more processors; and one or more computer-readable memories coupled to the one or more processors and having instructions stored thereon that are executable by the one or more processors to perform the method of any of the preceding embodiments.

In other embodiments, a digital certificate apparatus comprises a plurality of modules for performing the method of any of the preceding embodiments.

According to another aspect, a digital certificate system comprises one or more processors and one or more non-transitory computer-readable memories coupled to the one or more processors and configured with instructions executable by the one or more processors to cause the system to perform operations comprising: generating a digital certificate; generating a digital abstract of the digital certificate; transmitting the digital abstract of the digital certificate to one or more nodes of a blockchain for storage in the blockchain; obtaining a transaction identification associated with storing the digital abstract of the digital certificate in the blockchain; and associating a digital mark with the transaction identification.

According to another aspect, a non-transitory computer-readable storage medium is configured with instructions executable by one or more processors to cause the one or more processors to perform operations comprising: generating a digital certificate; generating a digital abstract of the digital certificate; transmitting the digital abstract of the digital certificate to one or more nodes of a blockchain for storage in the blockchain; obtaining a transaction identification associated with storing the digital abstract of the digital certificate in the blockchain; and associating a digital mark with the transaction identification.

According to another aspect, a blockchain-based digital certificate apparatus may comprise a first generating module for generating a digital certificate; a second generating module for generating a digital abstract of the digital certificate; a transmitting module for transmitting the digital abstract of the digital certificate to one or more nodes of a blockchain for storage in the blockchain; an obtaining module for obtaining a transaction identification associated with storing the digital abstract of the digital certificate in the blockchain; and an associating module for associating a digital mark with the transaction identification.

Embodiments disclosed in the specification have one or more technical effects. In some embodiments, the methods and systems can generate tamper-proof digital marks for representing entity endorsement. Storage in the blockchain allows for accurate record keeping of the original data. In other embodiments, when an entity registers its information (e.g., with an authority), the registration information as well as its anchor (association) with the registering entity can be stored to the blockchain in a blockchain transaction. Thus, the registration information becomes immutable and retrievable for verification. In still other embodiments, the methods and systems can generate unique digital marks associated with the registered entities for them to endorse digital certificates or other data. In yet other embodiments, the digital mark can be generated based on a transaction identification associated with storing the registration information in the blockchain. This uniquely links the digital mark to the corresponding registered entity and prevents fabrication of identities. In some embodiments, the methods and systems can generate digital certificates and store digital representations in blockchain. In other embodiments, when an entity endorses a digital certificate, the digital certificate as well as its anchor (association) with the digital mark of the endorsing entity can be stored to the blockchain in a blockchain transaction. Thus, the digital certificate and its endorser become immutable and retrievable for verification. Thus, the security of digital certificates is enhanced.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1A:
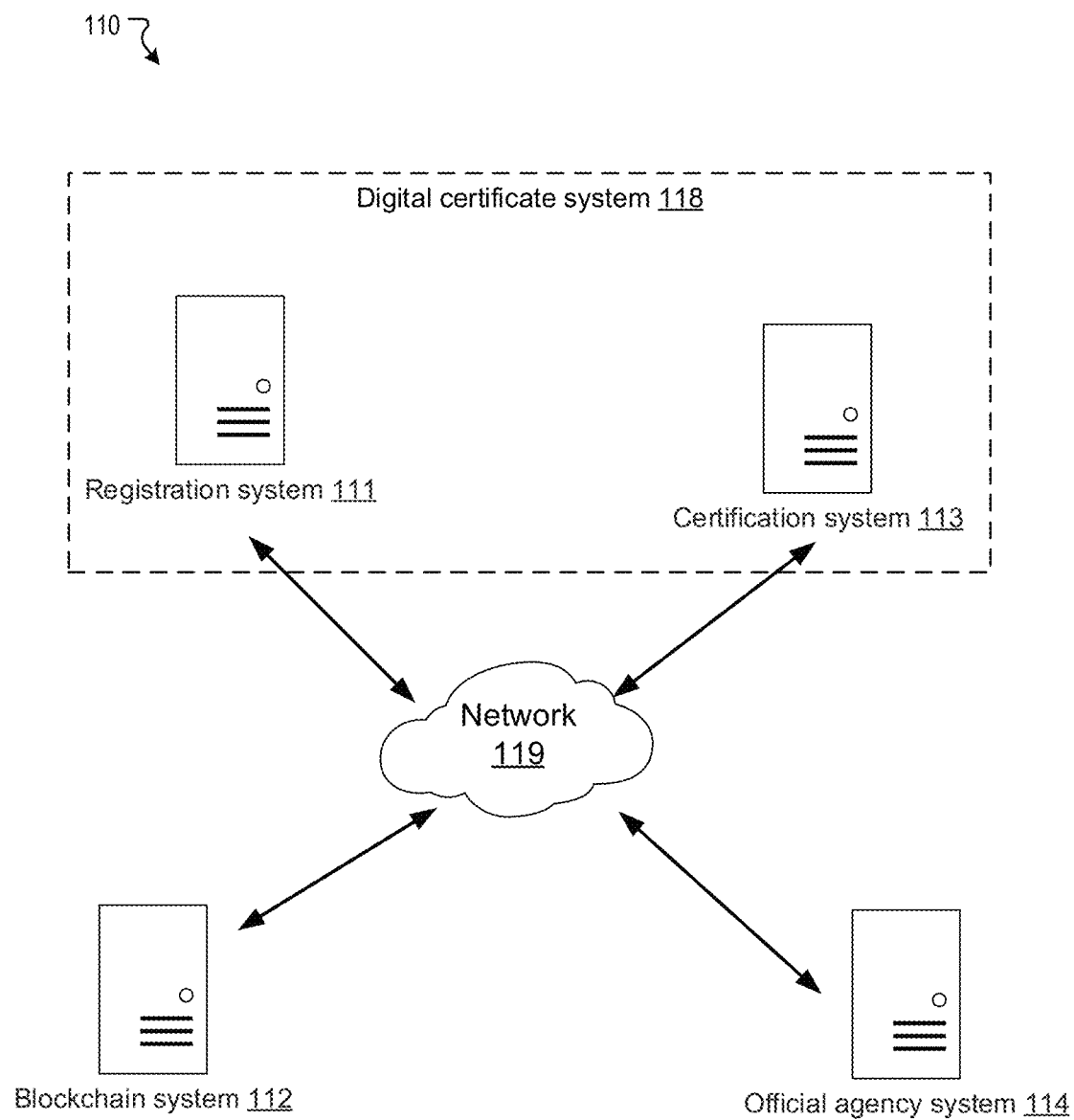
FIG. 1A illustrates an example of a blockchain-based digital certificate system, in accordance with various embodiments.

Embodiments disclosed herein include, but are not limited to, blockchain-based digital certificate systems, methods, and non-transitory computer readable media. In various embodiments, a digital mark (e.g., a seal/signature) may be generated based on officially verified information of the entity to serve as an endorsement by the entity. In some embodiments, a digital certificate may be issued based on anchoring the digital certificate with the endorsing digital mark. The immutability, consistency, and accuracy of blockchain can ensure the validity and uniqueness of the digital certificate and prevents tampering which often causes inconsistency or inaccuracy. In other embodiments, certifying digital certificates with digital signatures links the certificate contents with the certifying entities. Thus, the validity of the digital certificates can be effectively verified, the security of the digital certificates is improved, and their legal effect is promoted.

In various embodiments, the disclosed digital certificate systems, methods, and non-transitory computer readable media may be based on various types of blockchains depending on who is allowed to participate in the network, execute the consensus protocol, and maintain the shared blockchain ledger. The various types of blockchain may include, for example, public blockchain, consortium blockchain, private blockchain, etc. The description hereinafter refers to consortium blockchain. Notwithstanding, the disclosed digital certificate systems, methods, and non-transitory computer readable media may be applied with respect to other types of blockchain as well.

A blockchain may be considered a decentralized or partially centralized database, commonly referred to as a distributed ledger because the operation is performed by various nodes (e.g., computing devices) in a network. Any information may be written to the blockchain and saved or read from it. Nodes are, for example, computing devices or large computer systems that support the blockchain network and keep it running smoothly. Each node may provide a part or all of the functions of the blockchain. For example, a node that provides consensus verification may be referred to as a consensus-participating node (or consensus node). Consensus may be an algorithm of rules for a network of blockchain nodes to achieve commonly-accepted processing results. Through consensus, data is continuously added into a chain of blocks. If changes are made to the block, its link to the preceding block in the chain becomes invalid, and it becomes visible to all network participants who, through the consensus rules, may prevent any further unauthorized actions.

Consortium blockchain refers to a blockchain with consensus procedures controlled by preset nodes. The blockchain may allow everyone or only approved participants to access or adopt a hybrid access method. For example, the root hash and its API (Application Program Interface) may be open to the public; external parties are allowed to use API to make a certain number of inquiries and obtain information relating to blockchain status.

Consortium blockchains can best be understood when compared to their more popular counterpart, public blockchains. A public blockchain possesses no access restriction, meaning that absolutely anyone with an internet connection can become a participant of a public blockchain. More specifically, anyone in the world is able to read data that is included on the blockchain, and anyone in the world is allowed to execute transactions on a public blockchain. Also, there is no restriction as to who can participate in the consensus process for blockchains, which is the process that determines the individual or entity that can add a block to the blockchain. Public blockchains are considered to be fully decentralized, with control over the blockchain not being in the hands of any single individual or entity.

Consortium blockchains differ from their public counterparts in that they are permissioned, thus, not just anyone with an internet connection could gain access to a consortium blockchain. These types of blockchains could also be described as being semi-decentralized. Control over a consortium blockchain is not granted to a single entity, but rather a group of approved individuals. With a consortium blockchain, the consensus process is likely to differ from that of a public blockchain. Instead of anyone being able to partake in the procedure, consensus participants of a consortium blockchain are likely to be a group of pre-approved nodes on the network. The nodes may correspond to various countries, enterprises, or other entities. Thus, consortium blockchains possess the security features that are inherent in public blockchains, whilst also allowing for a greater degree of control over the network.

FIG. 1A shows an example of a system 110 for performing various disclosed steps and methods, in accordance with various embodiments. As shown, the system 110 may comprise a registration system 111, a blockchain system 112, a certification system 113, and an official agency system 114, each of which may correspond to one or more physical hardware devices or virtual devices coupled together via various types of communications represented by a network 119.

Each of the registration system 111, the blockchain system 112, the certification system 113, and the official agency system 114 may be implemented in one or more computing devices such as servers, computers, mobile phones, etc. For example, each of the systems may be implemented in a cluster of servers. The cluster of servers may employ load balancing.

Although the registration system 111, the blockchain system 112, the certification system 113, and the official agency system 114 are shown as single components in this figure, it should be appreciated that these systems can be implemented as single devices or multiple devices coupled together. That is, two or more of the systems in FIG. 1A may be integrated into a single system or implemented as separate systems. For example, the registration system 111 and the certification system 113 may be integrated into a digital certificate system 118 comprising one or more computing devices. The digital certificate system 118 may be referred to as a blockchain-based digital certificate system. If integrated, the registration system 111 and the certification system 113 may be implemented as various modules or similar components of the integrated system.

Each of the registration system 111, the blockchain system 112, the certification system 113, and the official agency system 114 may be installed with appropriate software (e.g., registration application program interface, blockchain application program interface, digital certificate generation program, official agency application interface) and/or hardware (e.g., wires, wireless connections) to access other systems or devices of the system 110. Each of the registration system 111, the blockchain system 112, the certification system 113, and the official agency system 114 may include one or more processors and one or more memories coupled to the one or more processors. The memories may be non-transitory and computer-readable and be configured with instructions executable by one or more processors to cause the one or more processors to perform operations described herein.

In general, the registration system 111, the blockchain system 112, the certification system 113, and the official agency system 114 may be able to communicate with one another through the network 119. For example, the registration system 111, the blockchain system 112, the certification system 113, and the official agency system 114 may be able to communicate with one another through one or more wired or wireless networks (e.g., the Internet) through which data can be communicated. Various aspects of the system components are described in further details below in reference to FIG. 1B to FIG. 7.

Figure 1B:
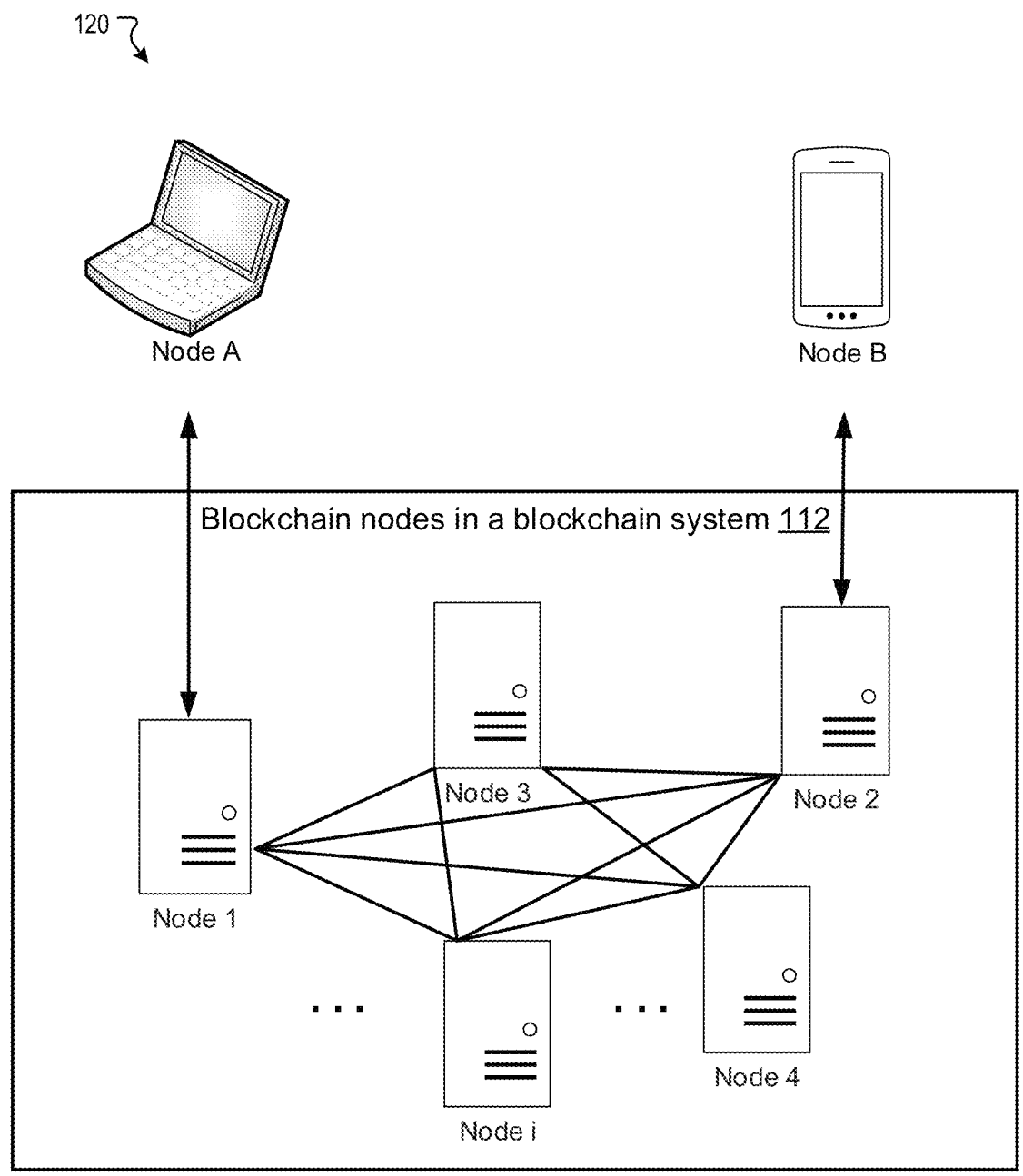
FIG. 1B illustrates an example of a blockchain network, in accordance with various embodiments.

FIG. 1B shows an example of a blockchain network 120, in accordance with various embodiments. As shown, the blockchain network 120 may comprise the blockchain system 112 described above. The blockchain system 112 may comprise a plurality of blockchain nodes (e.g., node 1, node 2, node 3, node 4, node i, etc.). The blockchain nodes may form a network (e.g., peer-to-peer network) with one blockchain node communicating with another. The order and the number of the blockchain nodes as shown are merely examples and for the simplicity of illustration. The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc.

In various embodiments, one or more nodes of the blockchain system 112 may interact with other systems and devices such as the registration system 111, the certification system 113, and the official agency system 114 described above. The interactions may involve transmission and/or reception of data for the purpose of, for instance, transactions, certificating, contracting, etc. In one example, node A (e.g., mobile phone, computer, etc.) may correspond to a device of the digital certificate system 118 and may transmit information to node 1 (or a plurality of nodes of the blockchain system 112) for storage in the blockchain. The storage process may be accomplished through a blockchain transaction. For instance, the information may be written into a blockchain contract (e.g., smart contract), and the blockchain transaction may be initiated by the node 1 (or one or more other nodes which have such privilege based on the blockchain consensus rules) to deploy the contract to the blockchain. Similar to other blockchain transactions, the transaction here may correspond to a transaction hash. The transaction hash may be an output of subjecting various transaction information to a hash function. The blockchain may store the hash value of the transaction. Later, when the information needs to be retrieved (e.g., for verification), node A/node B (e.g., mobile phone, computer, etc.) may instruct node 1/node 2 (or a plurality of nodes of the blockchain system 112) to initiate another transaction to obtain the information from the blockchain. The another transaction may query the address to obtain the information. Node B may belong to the digital certificate system 118, the official agency system 114, or another system (not shown) coupled to the blockchain system 112.

In the interaction with the blockchain system 112, node A and node B may be installed with appropriate blockchain software to initiate, forward, or access the transaction. Node A may access the blockchain through communication with node 1 or one or more other nodes of the blockchain, and node B may access the blockchain through communication with node 2 or one or more other nodes of the blockchain. Node A may submit the transaction to the blockchain through node 1 or similar nodes to request adding the transaction to the blockchain.

The blockchain may be maintained by a plurality of blockchain nodes each comprising or coupling to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices similar to node A.

In some embodiments, after receiving a transaction request of an unconfirmed transaction, the recipient blockchain node may perform some preliminary verification of the transaction. For example, referring to FIG. 1B, node 1 may perform the preliminary verification after receiving a transaction from node A. Once verified, the transaction may be stored in the pool database of the recipient blockchain node (e.g., node 1), which may also forward the transaction to one or more other blockchain nodes (e.g., node 3, node 4). The one or more other blockchain nodes may repeat the process done by the recipient node. Once the transactions in the corresponding pool database reach a certain level (e.g., a threshold amount), the blockchain nodes may each verify the batch of transactions in the corresponding pool database according to consensus rules or other rules.

If the blockchain transaction involves a blockchain contract (e.g., smart contract), the blockchain node may execute the blockchain contract locally. A blockchain contract is a computer protocol intended to digitally facilitate, verify, or enforce the negotiation or performance of a contract. Blockchain contracts allow the performance of credible blockchain transactions without third parties. An example of a blockchain transaction may encode data in contract code for data storage (by contract deployment) and retrieval (by accessing or executing contract). The blockchain contract may include user-written contract code, such as entity information, digital abstract of a digital certificate, etc.

A certain blockchain node that successfully verifies its batch of blockchain transactions in accordance with consensus rules may pack the blockchain transactions to add to its local copy of the blockchain and spread the results to other blockchain nodes. The certain blockchain node may be a blockchain node that has first successfully completed the verification, that has obtained the verification privilege, or that has been determined based on another consensus rule, etc. Then, the other blockchain nodes may execute the blockchain transactions locally, verify the execution results with one another (e.g., by performing hash calculation), and synchronize their copies of the blockchain with that of the certain blockchain node. By updating their local copies of the blockchain, the other blockchain nodes may similarly write such information in the blockchain transaction into respective local memories. Thus, the blockchain contract is deployed. A deployed contract can be later accessed through its corresponding address on blockchain for execution. For example, the data stored in the contract can be retrieved. If the verification fails at some point, the blockchain transaction is rejected. Notwithstanding the above, other types of blockchain systems and associated consensus rules may be applied to the disclosed blockchain system.

Figure 2:
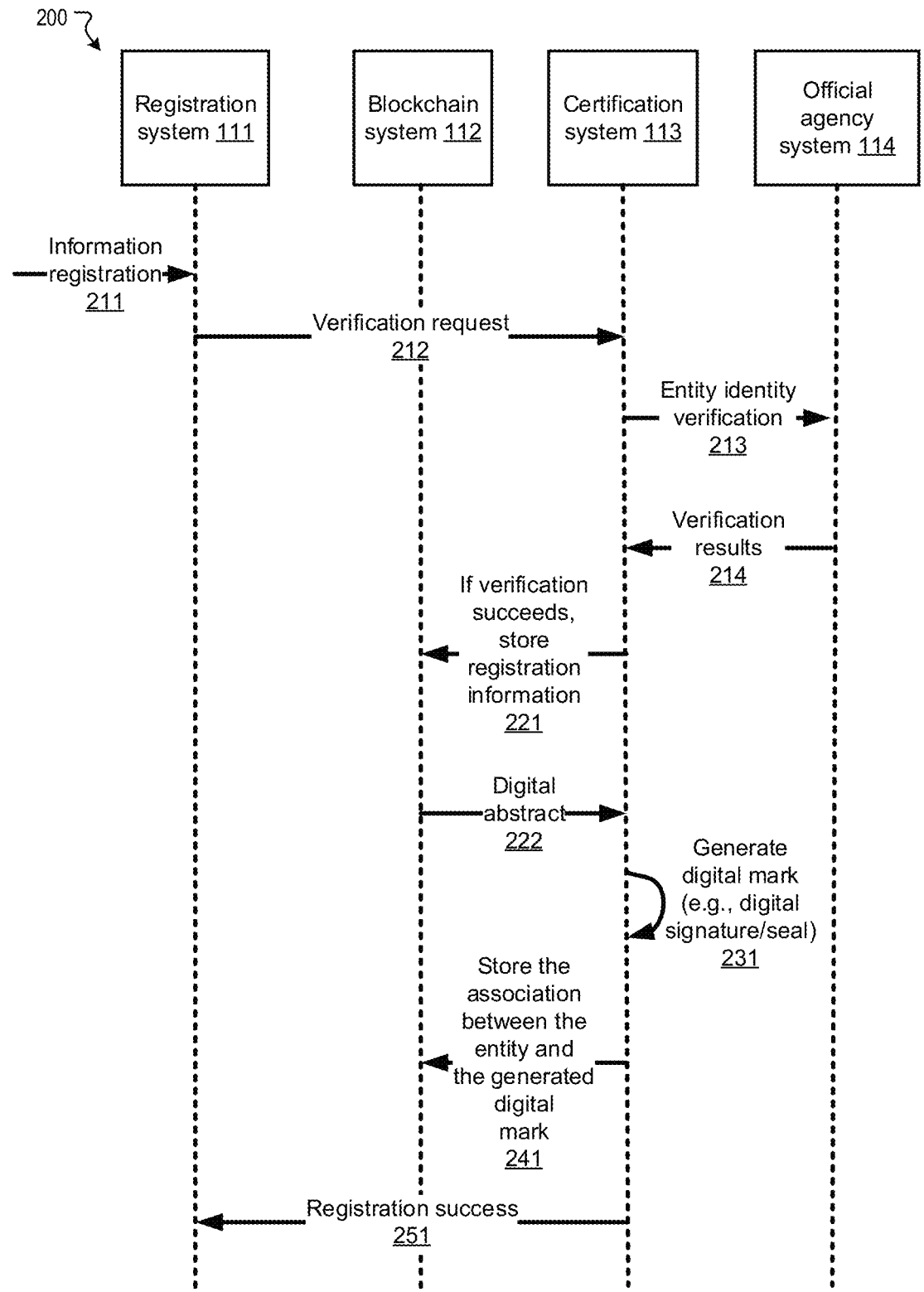
FIG. 2 illustrates an example of a method for generating blockchain-based digital marks, in accordance with various embodiments.

FIG. 2 illustrates an example of a method 200 for generating blockchain-based digital marks, in accordance with various embodiments. The method 200 may be implemented by one or more components (e.g., the registration system 111, the blockchain system 112, the certification system 113, the official agency system 114) of the system 110 of FIG. 1A. As described earlier, though shown as separate systems, the registration system 111 and the certification system 113 may be integrated into the digital certificate system 118 comprising one or more computing devices. The operations presented below are intended to be illustrative. Depending on the implementation, the method 200 may include additional, fewer, or alternative steps performed in various orders or in parallel.

In some embodiments, at step 211, a first entity may initiate information registration through the registration system 111. The registration information may comprise the entity's identity information, such as identification number, address, contact information, etc. The entity may be associated with an individual, a corporation or enterprise, an organization, etc. For example, a corporation may initiate registration of corporate information with the registration system 111 by submitting information of the corporation (e.g., a name of the corporation, a representative of the corporation, a contact of the corporation, etc.).

At step 212, the registration system 111 may transmit a verification request 212 to the certification system 113. The registration information may also be transmitted to the certification system 113.

At step 213, the certification system 113 may request verification of the identity of the entity with the official agency system 114. For example, the certification system 113 may communicate with an application program interface of the official agency system 114 to verify the identity. For another example, the certification system 113 may transmit the registration information to request the official agency system 114 to query a corporation registration database and verify the identity of the corporation.

At step 214, the official agency system 114 may return a verification result to the certification system 113.

At step 221, if the verification succeeds, the certification system 113 may transmit the registration information to the blockchain system 112 to store in a blockchain maintained by the blockchain system 112. The registration information may be considered public information and available to various nodes of the blockchain.

In various embodiments, certification system 113 may include one or more lightweight nodes (e.g., node A, node B). The certification system 113 may initiate a blockchain transaction (or transaction for short) through a node of the blockchain system 112 (e.g., node 1) coupled to the lightweight node(s). For example, the registration information may be written into a blockchain contract (e.g., smart contract), and the blockchain transaction may be initiated to deploy the contract to the blockchain. By the deployment, the contract is accessible from the blockchain for execution, retrieval, or other operations. The blockchain transaction in this case may correspond to a transaction identification (e.g., first transaction hash). For example, the blockchain transaction identification can be a hash value of the blockchain transaction. The transaction identification may be also associated with the entity. The blockchain may store the registration information. The blockchain may also store the corresponding transaction identification. Thus, the blockchain transaction identification and the registration information are anchored (associated). By querying the transaction identification, the blockchain-stored registration information can be retrieved. For example, when the blockchain transaction identification is sent to the blockchain system 112 (e.g., a blockchain node), the blockchain system 112 may execute the blockchain contract to retrieve the blockchain-stored registration information. There are many other suitable ways to store and retrieve the registration information on the blockchain. A person having ordinary skill in the art should appreciate that the embodiments of this specification are not limited to the above example. The transaction and transaction identification described in this paragraph may be referred to as the first transaction and first transaction identification.

At step 222, the blockchain system 112 may return the first transaction identification (e.g., digital abstract) to the certification system 113. The first transaction identification may be a digital tamper-proof representation that uniquely represents the entity and corresponds to the registration information. For example, the blockchain system 112 may return the hash value of the first transaction as the first transaction identification to the certification system 113. The first transaction identification indicates that the entity exists in the blockchain.

At step 231, the certification system 113 may generate a digital mark (e.g., digital signature/seal) based at least on the first transaction identification for the entity. The digital mark (e.g., digital signature/seal) can be uniquely identified based on the first transaction identification (e.g., the hash value of the first transaction). The certification system 113 may maintain a relationship between the entity and the digital mark (e.g., digital signature/seal).

At step 241, the certification system 113 may transmit the association relationship between the digital mark (e.g., digital signature/seal) and the entity to the blockchain system 112 to store in the blockchain. Thus, the association relationship between the generated digital mark (e.g., digital signature/seal) and the entity may be stored by the blockchain system 112 and/or the certification system 113.

In various embodiments, the certification system 113 may initiate another blockchain transaction through a node of the blockchain system 112. The transaction described in this paragraph may be referred to a second transaction and correspond to a second transaction identification. For example, an association relationship of the association in step 241 between the digital mark (e.g., digital signature/seal) and the entity may be written into a blockchain contract (e.g., smart contract). Similar to the process described above with reference to step 221 above, the second blockchain transaction may be initiated to deploy the contract to the blockchain. The second blockchain transaction may correspond to the second transaction identification (e.g., second transaction hash), which is also associated with the entity. The blockchain may store the association relationship. The blockchain may also store the corresponding second transaction identification. By querying the second transaction identification, the blockchain-stored association can be retrieved.

At step 251, if the above steps are successfully executed, the certification system 113 may return a message of registration success to the registration system 111.

Figure 3:
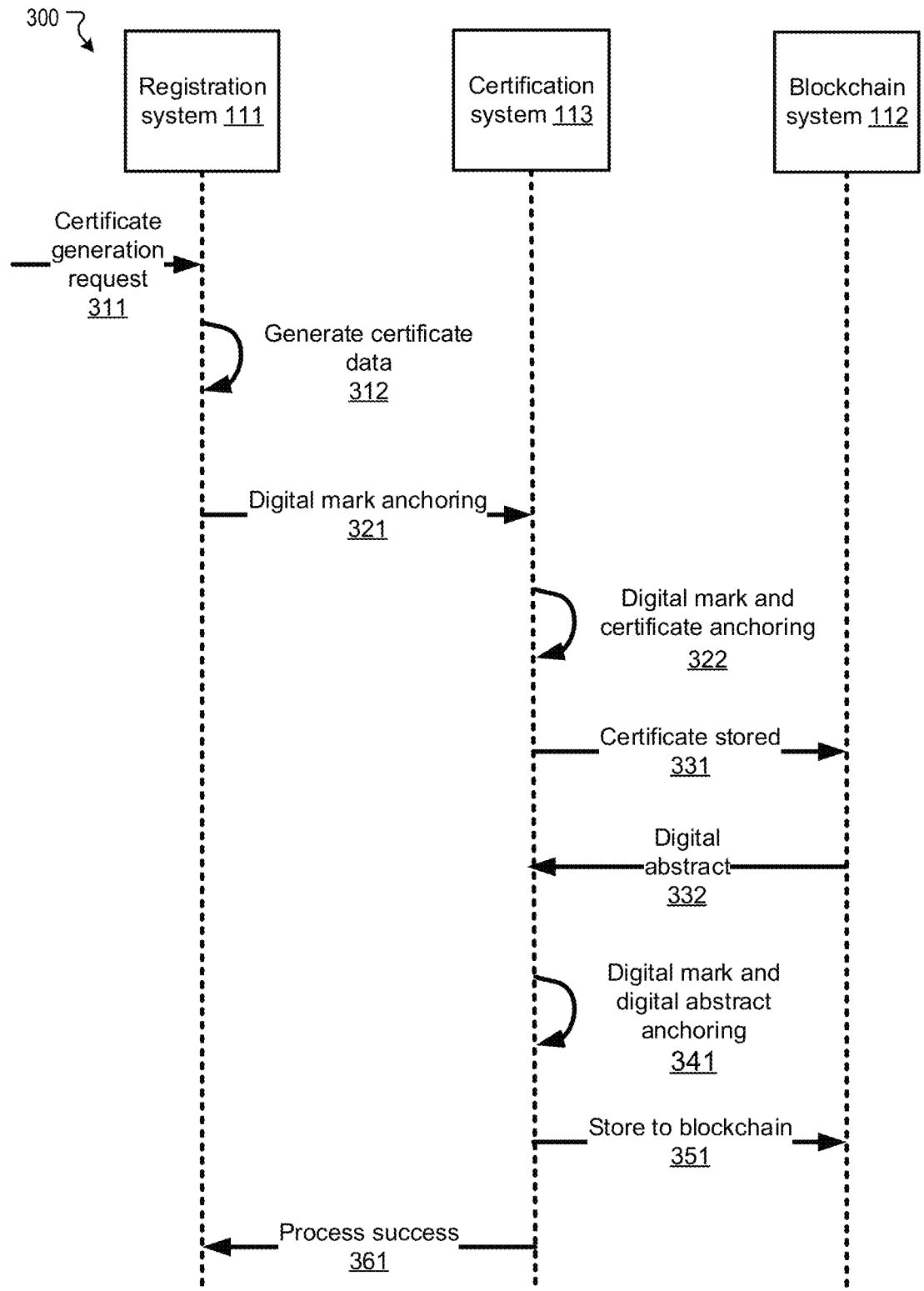
FIG. 3 illustrates an example of a method for issuing blockchain-based digital certificates, in accordance with various embodiments.

FIG. 3 illustrates an example of a method 300 for issuing blockchain-based digital certificates, in accordance with various embodiments. The method 300 may be implemented by one or more components (e.g., the registration system 111, the blockchain system 112, the certification system 113) of the system 110 of FIG. 1A. As described earlier, though shown as separate systems, the registration system 111 and the certification system 113 may be integrated into the digital certificate system 118 comprising one or more computing devices. The operations presented below are intended to be illustrative. Depending on the implementation, the method 300 may include additional, fewer, or alternative steps performed in various orders or in parallel. The method 300 may be executed after the method 200.

In some embodiments, at step 311, the first entity may initiate a certificate (e.g., digital certificate) generation request through the registration system 111. In this specification, a certificate may include a document attesting a certain fact or other information. The certificate may be endorsed by an entity. For example, entities like corporates or institutions may issue financial transaction receipts in the form of digital certificates. For another example, an insurance agency may issue insurance policies or proof of insurance in the form of digital certificates.

At step 312, the registration system 111 may generate certificate data. The certificate data may comprise contents of the certificate according to the request. For example, a request to generate a receipt for a financial transaction may correspond to certificate data such as date of the financial transaction, amount of the financial transaction, payor and payee of the financial transaction, etc.

At step 321, the registration system 111 may transmit the requested certificate to the certification system 113 and request the certification system 113 to anchor the requested certificate with the digital mark (e.g., digital signature/seal) described above with respect to FIG. 2. In this specification, anchoring may mean associating or otherwise establishing an association. The association may be stored in one or more components of the digital certificate system 118.

At step 322, the certification system 113 may anchor the requested certificate with the digital mark (e.g., digital signature/seal). In some embodiments, the certification system 113 may generate a digital abstract of the digital certificate.

At step 331, the certification system 113 may transmit the digital abstract of the digital certificate to the blockchain system 112 to request the blockchain system to 112 to store the digital abstract in the blockchain.

In various embodiments, the certification system 113 may initiate another blockchain transaction through a node of the blockchain system 112. The transaction described in this paragraph may be referred to a third transaction and correspond to a third transaction identification. For example, the digital abstract of the digital certificate may be written into a blockchain contract (e.g., smart contract). Similar to the process described above with reference to step 221 above, the third blockchain transaction may be initiated to deploy the contract to the blockchain. The third blockchain transaction may correspond to the third transaction identification (e.g., third transaction hash). The third transaction identification may be associated with information such as the digital abstract of the digital certificate, a timestamp of the third transaction, an initiator of the third transaction, etc. The blockchain may store the digital abstract (e.g., hash value of the digital certificate), but not store details (e.g., plaintext) of the digital certificate to ensure privacy. The blockchain may also store the corresponding third transaction identification. By querying the third transaction identification, the blockchain-stored digital abstract of the digital certificate can be retrieved. Other alternative methods to smart contract may be employed to achieve storage of the certificate in the blockchain.

At step 332, the blockchain system 112 may return the third transaction identification (e.g., third transaction hash) of the third transaction for storing the digital abstract of the digital certificate to the certification system 113. By steps 331 and 332, the digital abstract of the digital certificate stored in the blockchain can be used later to verify against abstracts of suspicious digital certificates.

At step 341, the certification system 113 may anchor the digital seal/signature with the third transaction identification of the third transaction for storing the digital abstract of the certificate. Since at step 322, the requested certificate is anchored with the digital mark (e.g., digital signature/seal), the digital certificate stored in the certification system 113 is linked to its digital abstract representation stored in the blockchain.

At step 351, the certification system 113 may transmit the association among the digital seal/signature, the third transaction identification of the third transaction for storing the digital abstract of the certificate, and the digital abstract of the digital certificate to the blockchain system 112 to store in the blockchain. Thus, the entity, the digital seal/signature, and the digital certificate are associated, and the association relationships are stored in the blockchain.

In various embodiments, the certification system 113 may initiate another blockchain transaction through a node of the blockchain system 112. The transaction described in this paragraph may be referred to a fourth transaction and correspond to a fourth transaction identification. For example, an association relationship of the association in step 351 may be written into a blockchain contract (e.g., smart contract). Similar to the process described above with reference to step 221 above, the fourth blockchain transaction may be initiated to deploy the contract to the blockchain. The fourth blockchain transaction may correspond to a fourth transaction identification (e.g., fourth transaction hash). The blockchain may store the association relationship. The blockchain may also store the corresponding transaction identification. By querying the fourth transaction identification, the blockchain-stored association can be retrieved.

At step 361, if the above steps are successfully executed, the certification system 113 may return a message of success to the registration system 111.

Figure 4:
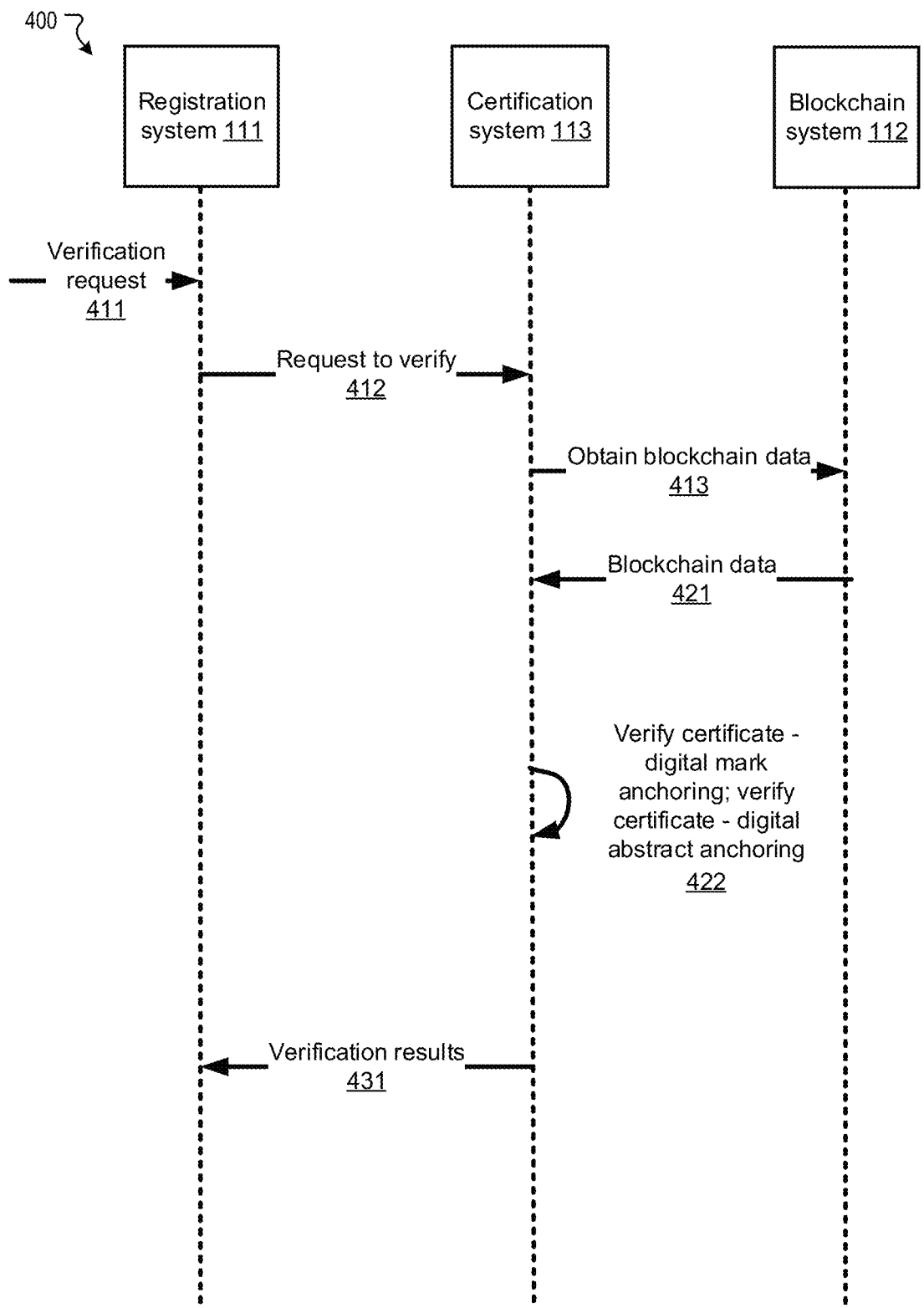
FIG. 4 illustrates an example of a method for verifying blockchain-based digital certificates, in accordance with various embodiments.

FIG. 4 illustrates an example of a method 400 for verifying blockchain-based digital certificates, in accordance with various embodiments. The method 400 may be implemented by one or more components (e.g., the registration system 111, the blockchain system 112, the certification system 113) of the system 110 of FIG. 1A. As described earlier, though shown as separate systems, the registration system 111 and the certification system 113 may be integrated into the digital certificate system 118 comprising one or more computing devices. The operations presented below are intended to be illustrative. Depending on the implementation, the method 400 may include additional, fewer, or alternative steps performed in various orders or in parallel.

In some embodiments, at step 411, a third-party entity may initiate a verification of the certificate through the registration system 111. For example, the third-party may have obtained a digital certificate and would like to verify if the obtained digital certificate exists in the blockchain in order to authenticate the certificate. Thus, the third-party may submit the digital certificate for verification.

At step 412, the registration system 111 may transmit a request to verify the certificate such as the anchoring of the digital mark (e.g., digital signature/seal) to the certification system 113.

At step 413, in response, the certification system 113 may obtain data corresponding to the certificate from the blockchain to verify the certificate. For example, the certification system 113 may query blockchain-stored information (e.g., a digital abstract associated with the certificate, a digital mark (e.g., digital signature/seal) associated with the certificate) through a node of the blockchain system 112.

At step 421, the certification system 113 may obtain the corresponding data from the blockchain. If the certificate exists in the blockchain, the data may comprise the information stored in the blockchain described above with reference to FIG. 3, such as the digital abstract associated with the certificate (referred to as the blockchain-stored digital abstract), the digital mark (e.g., digital signature/seal) associated with the certificate (referred to as the blockchain-stored digital mark).

At step 422, the certification system 113 may verify the anchoring (1) between the digital mark (e.g., digital signature/seal) and the certificate and (2) between an abstract of the certificate and the blockchain-stored digital abstract associated with the certificate. Since the data may comprise a cryptographic process used for generating the digital abstract of the digital certificate (e.g., SHA-256 hashing), the certification system 113 may generate the abstract of the certificate for performing the verification at step 422.

Alternatively, the blockchain system 112 may perform the verification and return results to the certification system 113.

At step 431, the certification system 113 may return verification results to the registration system 111.

Figure 5A:
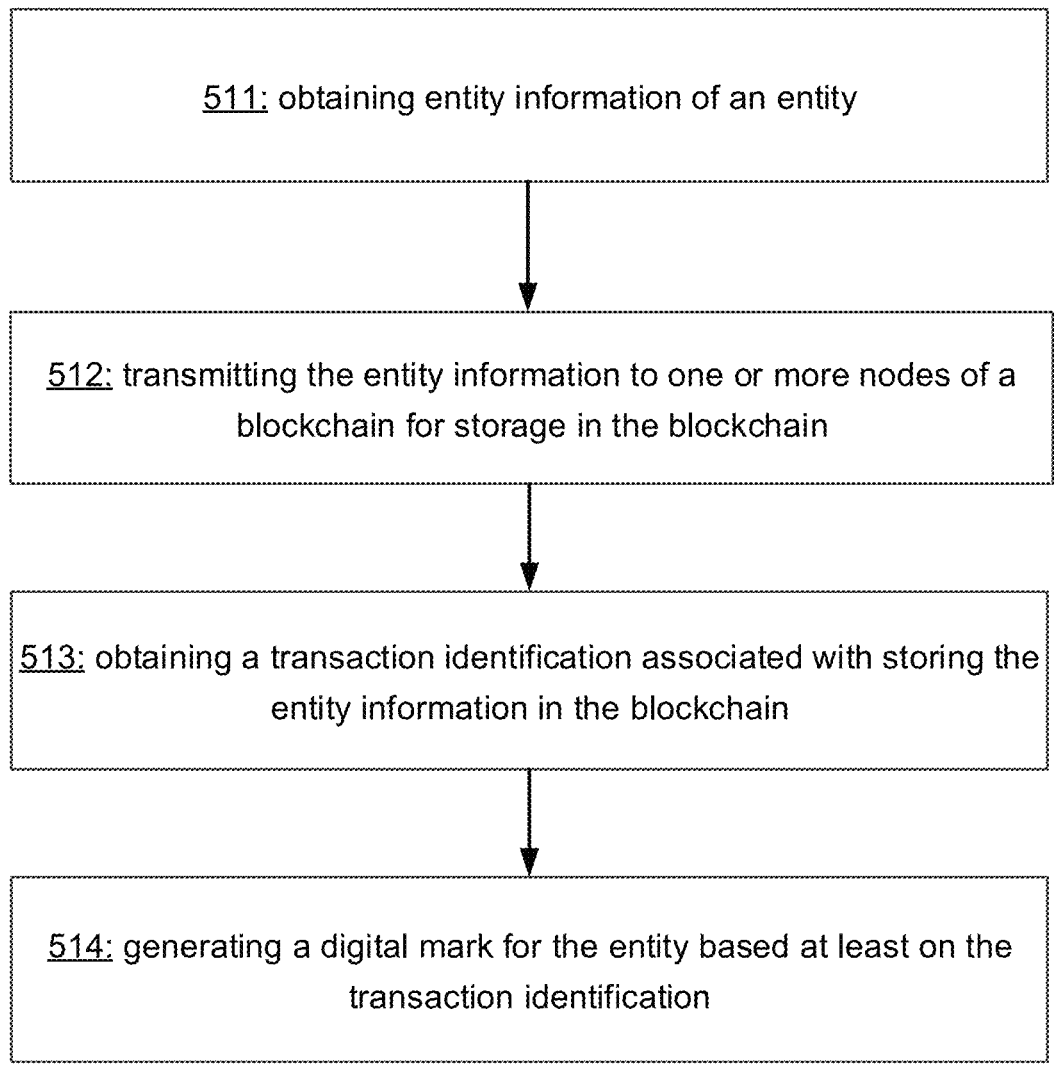
FIG. 5A illustrates a flow chart of an example of a method for generating blockchain-based digital marks, in accordance with various embodiments.

FIG. 5A illustrates a flow chart of an example of a method 510 for generating blockchain-based digital marks, in accordance with various embodiments. The method 510 may be implemented by one or more components (e.g., the digital certificate system 118) of the system 110 of FIG. 1A. The method 510 may be implemented by a system comprising various hardware machine and/or software. For example, the digital certificate system 118 may be implemented by one or more systems or devices (e.g., computers, servers). The system implementing the method 510 may comprise one or more processors and one or more non-transitory computer-readable storage media (e.g., one or more memories) coupled to the one or more processors and configured with instructions executable by the one or more processors to cause the system (e.g., the processor) to perform the method 510. The operations presented below are intended to be illustrative. Depending on the implementation, the method 510 may include additional, fewer, or alternative steps performed in various orders or in parallel. An example of an implementation of the method 510 is described above with reference to FIG. 2.

Step 511 includes obtaining entity information of an entity. In some embodiments, the entity is a corporation, and the entity information comprises corporation registration information certified by an official agency. For example, the digital certificate system 118 may obtain the entity information from the entity as registration information. The digital certificate system 118 may forward the registration information to an official agency system for verification. Once verified, the following steps can be performed to generate the digital mark.

Step 512 includes transmitting the entity information to one or more nodes of a blockchain for storage in the blockchain. In some embodiments, transmitting the entity information to the one or more nodes of the blockchain for storage in the blockchain comprises: writing at least the entity information into a blockchain contract; and causing the one or more nodes to initiate a blockchain transaction to deploy the blockchain contact. For example, the nodes of the blockchain may have privileges to initiate blockchain transactions. The digital certificate system 118 may couple to one or more of the nodes to initiate the blockchain transaction. The nodes may verify and execute the blockchain transaction according to consensus rules. After the deployment, the blockchain transaction is packed into a new block of the blockchain, a copy of which is available to the nodes. Details can be referred to the step 221 described above. The blockchain transaction in this case may correspond to a transaction identification (e.g., transaction hash). The blockchain may store the entity information. The blockchain may also store the corresponding transaction identification. By querying the transaction identification, the blockchain-stored entity information can be retrieved.

Step 513 includes obtaining a transaction identification (e.g., digital abstract) associated with storing the entity information in the blockchain. The transaction identification may be returned by one or more nodes of the blockchain when the entity information is successfully stored in the blockchain. In some embodiments, the transaction identification comprises a hash value of the blockchain transaction. For example, the hash algorithm can be understood as a function that compresses messages of any length into a fixed-length message digest. Commonly-used hash functions include MD5 and SHA. The hash value of the blockchain transaction may include an output of a hash function having various information of the blockchain transaction as inputs. The various information of the blockchain transaction may include one or more transaction parameters such as "from" (sender address), "value" (transaction value), "gas" (expense for completing the transaction), "data" (blockchain contract data), etc. The hash algorithm in the blockchain is irreversible, that is, the forward calculation is easy, and the reverse calculation cannot be done even if all computing resources are exhausted. Thus, the hash value of the blockchain transaction is unique. Details can be referred to the step 222 described above.

Step 514 includes generating a digital mark for the entity based at least on the transaction identification. The digital mark is associated with the entity. The association relationship may be maintained by the digital certificate system 118. In some embodiments, the digital mark comprises the transaction identification (e.g., a hash value of the blockchain transaction). A hash value of certain data is the numeric result of applying hash algorithm to the data such as the various information of the blockchain transaction described above. For example, the digital mark may be the transaction identification of step 513. The transaction identification may be alternatively referred to as a digest of the corresponding transaction. Details can be referred to the step 231 described above.

In some embodiments, the digital mark comprises at least one of a digital seal or a digital signature; and the digital mark is associable with a digital certificate to show endorsement by the entity. For example, by the association, the digital mark and the digital certificate may be combined into one file. For another example, by the association, the digital certificate may be linked to the digital mark.

In some embodiments, the method further comprises transmitting an association relationship between the entity and the digital mark to the one or more nodes for storage in the blockchain. For example, the nodes of the blockchain may have privileges to initiate blockchain transactions. The digital certificate system 118 may couple to one or more of the nodes to initiate the blockchain transaction. The nodes may verify and execute the blockchain transaction according to consensus rules. After the deployment, the blockchain transaction is packed into a new block of the blockchain, a copy of which is available to the nodes. Details can be referred to the step 241 described above. The blockchain transaction in this case may correspond to a transaction identification (e.g., transaction hash). The blockchain may store the association. The blockchain may also store the corresponding transaction identification. By querying the transaction identification, the blockchain-stored association can be retrieved.

In some embodiments, the method further comprises: generating a digital certificate; associating the digital mark with the digital certificate; transmitting the digital certificate to one or more nodes of a blockchain for storage in the blockchain; obtaining another digital abstract associated with storing the digital certificate in the blockchain; associating the digital mark with the another digital abstract; and transmitting an association relationship between the digital mark and the transaction identification to the one or more nodes for storage in the blockchain. The association of the digital mark with the another digital abstract shows endorsement by the entity. Since the digital certificate is linked to the another digital abstract, the digital certificate is endorsed by the entity. The method may further comprise transmitting the association relationship of the digital mark with the transaction identification to the one or more nodes for storage in the blockchain. More details are described below with reference to FIG. 5B.

In other embodiments, the digital certificate may be obtained by any means. The method further comprises: generating a digital abstract of a digital certificate associated with the entity; transmitting the digital abstract of the digital certificate to the one or more nodes of the blockchain for storage in the blockchain; obtaining another transaction identification associated with storing the digital abstract of the digital certificate in the blockchain; and associating the digital mark with the another transaction identification. The association of the digital mark with the another transaction identification shows endorsement by the entity. Because the digital certificate is linked to the another transaction identification, the digital certificate is endorsed by the entity. The method may further comprise transmitting an association relationship of the digital mark with the another transaction identification to the one or more nodes for storage in the blockchain.

In still other embodiments, the method further comprises: generating a digital abstract of a digital certificate associated with the entity; and associating the digital mark with the digital abstract. The association of the digital mark with the digital abstract shows endorsement by the entity. Since the digital certificate is linked to the digital abstract, the digital certificate is endorsed by the entity. The method may further comprise transmitting an association relationship of the digital mark with the digital abstract to the one or more nodes for storage in the blockchain.

In yet other embodiments, the method further comprises: associating the digital mark with a digital certificate associated with the entity. The association of the digital mark with the digital certificate shows endorsement by the entity. The method may further comprise transmitting an association relationship of the digital mark with the digital certificate to the one or more nodes for storage in the blockchain.

Figure 5B:
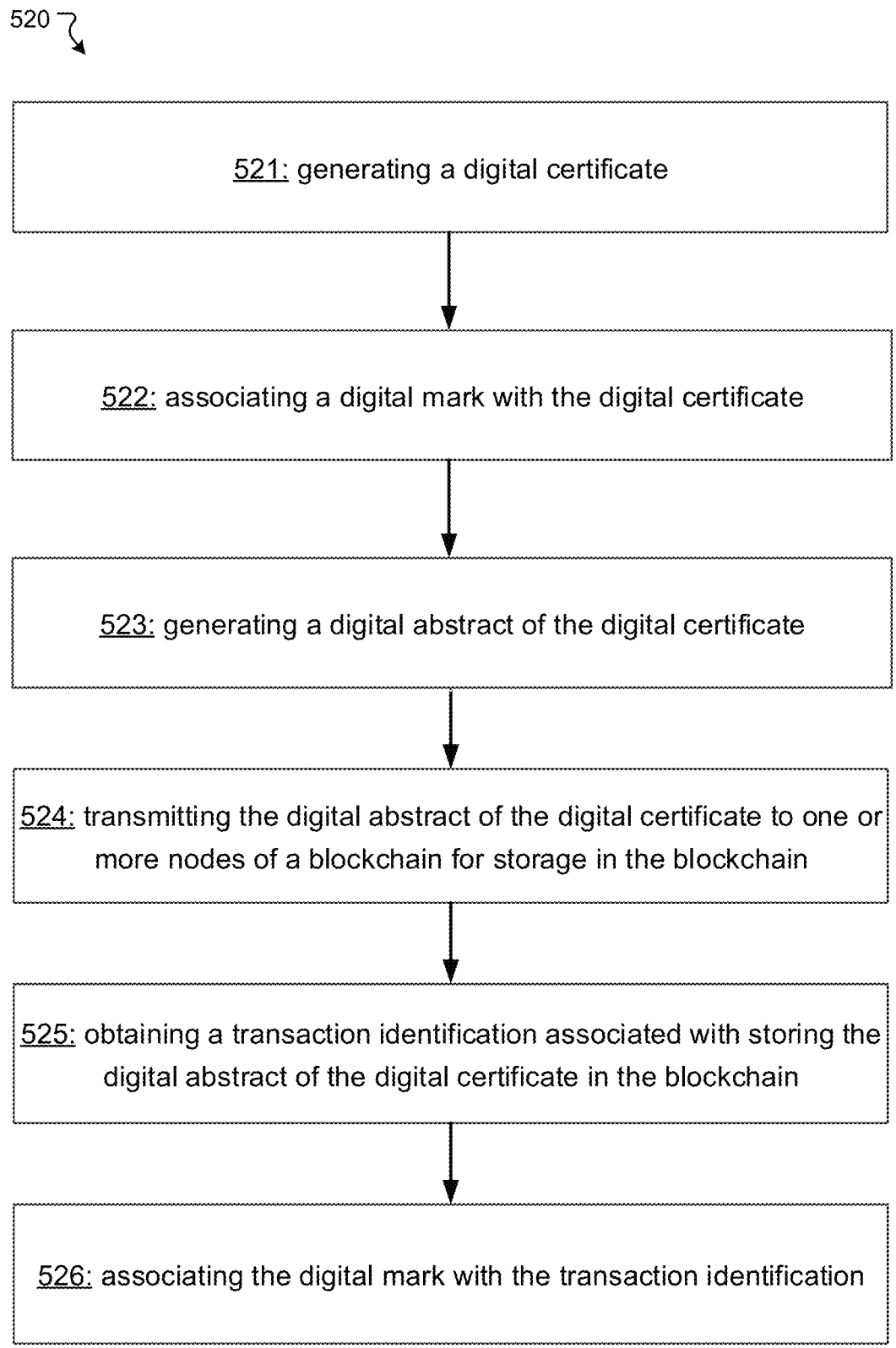
FIG. 5B illustrates a flow chart of an example of a method for implementing blockchain-based digital certificates, in accordance with various embodiments.

FIG. 5B illustrates a flow chart of an example of a method 520 for implementing blockchain-based digital certificates, in accordance with various embodiments. The method 520 may be implemented by one or more components (e.g., the digital certificate system 118) of the system 110 of FIG. 1A. The method 520 may be implemented by a system comprising various hardware machine and/or software. For example, the digital certificate system 118 may be implemented by one or more systems or devices (e.g., computers, servers). The system implementing the method 520 may comprise one or more processors and one or more non-transitory computer-readable storage media (e.g., one or more memories) coupled to the one or more processors and configured with instructions executable by the one or more processors to cause the system (e.g., the processor) to perform the method 520. The operations presented below are intended to be illustrative. Depending on the implementation, the method 520 may include additional, fewer, or alternative steps performed in various orders or in parallel. An example of an implementation of the method 520 is described above with reference to FIG. 3 and FIG. 4.

Step 521 includes generating a digital certificate. In some embodiments, generating the digital certificate comprises: obtaining contents of the digital certificate from an entity, the entity being a corporation; and generating the digital certificate comprising the contents. For example, the digital certificate system 118 may obtain contents that need to be shown on the digital certificate from the entity or another source. Details can be referred to the step 312 described above.

Optional step 522 includes associating a digital mark with the digital certificate. The digital mark may be that described above with reference to FIG. 5A. The digital mark may be maintained by the digital certificate system 118. In some embodiments, the digital mark comprises a digital seal and/or a digital signature; and the digital mark is associated with endorsement by an entity. Details can be referred to the step 322 described above.

Step 523 includes generating a digital abstract of the digital certificate. For example, a hash process such as SHA-256 may be used to generate the digital abstract from the digital certificate. Thus, contents of the digital certificate are transformed to a cryptographic representation.

Step 524 includes transmitting the digital abstract of the digital certificate to one or more nodes of a blockchain for storage in the blockchain. In some embodiments, transmitting the digital abstract of the digital certificate to the one or more nodes of the blockchain for storage in the blockchain comprises: writing the digital abstract of the digital certificate and a cryptographic process used for generating the digital abstract (e.g., SHA-256 hashing) into a blockchain contract; and causing the one or more nodes to initiate a blockchain transaction to deploy the blockchain contact. For example, the nodes of the blockchain may have privileges to initiate blockchain transactions. The digital certificate system 118 may couple to one or more of the nodes to initiate the blockchain transaction. The nodes may verify and execute the blockchain transaction according to consensus rules. After the deployment, the blockchain transaction is packed into a new block of the blockchain, a copy of which is available to the nodes. Details can be referred to the step 331 described above. The blockchain transaction in this case may correspond to a transaction identification (e.g., transaction hash). The blockchain may store the digital abstract (e.g., hash value of the digital certificate), but not store details (e.g., plaintext) of the digital certificate to ensure privacy. The blockchain may also store the corresponding transaction identification. By querying the transaction identification, the blockchain-stored digital abstract of the digital certificate can be retrieved.

Step 525 includes obtaining a transaction identification associated with storing the digital abstract of the digital certificate in the blockchain. The transaction identification (e.g., an abstract of the transaction) may be returned by one or more nodes of the blockchain when the digital abstract of the digital certificate is successfully stored in the blockchain. In some embodiments, the digital abstract comprises a hash value of the digital certificate; and the transaction identification comprises a hash value of the blockchain transaction. The blockchain may store the digital abstract rather than the plaintext of the digital certificate in order to protect privacy. Details can be referred to the step 332 described above.

Step 526 includes associating the digital mark with the transaction identification. Details can be referred to the anchoring step 341 described above. In some embodiments, associating the digital mark with the transaction identification comprises: associating the digital mark, the transaction identification, and the digital abstract. In some embodiments, the method further comprises: transmitting an association relationship between the digital mark and the transaction identification to the one or more nodes for storage in the blockchain. In some embodiments, the method further comprises: transmitting an association among the digital mark, the transaction identification, and the digital abstract. For example, the nodes of the blockchain may have privileges to initiate blockchain transactions. The digital certificate system 118 may couple to one or more of the nodes to initiate the blockchain transaction. The nodes may verify and execute the blockchain transaction according to consensus rules. After the deployment, the blockchain transaction is packed into a new block of the blockchain, a copy of which is available to the nodes. Details can be referred to the step 351 described above. The blockchain transaction in this case may correspond to a transaction identification (e.g., transaction hash). The blockchain may store the association. The blockchain may also store the corresponding transaction identification. By querying the transaction identification, the blockchain-stored association can be retrieved.

In some embodiments, the method further comprises: in response to a verification request for an unverified digital certificate endorsed by an unverified digital mark, obtaining a transaction identification corresponding to the unverified digital certificate; according to the transaction identification corresponding to the unverified digital certificate, obtaining a blockchain-stored digital abstract and a blockchain-stored digital mark; generating a digital abstract of the unverified digital certificate according to a cryptographic process used for generating the digital abstract of the digital certificate; verifying if the blockchain-stored digital abstract is consistent with the digital abstract of the unverified digital certificate and if the blockchain-stored digital mark is consistent with the unverified digital mark; in response to determining that the blockchain-stored digital abstract is consistent with the digital abstract of the unverified digital certificate and the blockchain-stored digital mark is consistent with the unverified digital mark, determining that the unverified digital certificate is authentic; and in response to determining that the blockchain-stored digital abstract is inconsistent with the digital abstract of the unverified digital certificate or the blockchain-stored digital mark is inconsistent with the unverified digital mark, determining that the unverified digital certificate is unauthentic.

For example, as described above with reference to FIG. 4, a third-party may have received the unverified digital certificate endorsed by an unverified mark of an unverified entity and would like to verify its authenticity. Since the blockchain stores association relationships among entities, abstracts for digital certificates, transaction identifications, and corresponding digital marks, the digital certificate system 118 may obtain the transaction identification corresponding to the unverified digital certificate and correspondingly retrieve blockchain-stored information, for example, by initiating a transaction via one or more nodes of the blockchain to obtain data (e.g., blockchain-stored digital abstract, blockchain-stored digital mark, blockchain-stored entity information) associated with the unverified digital certificate. For verification, the digital certificate system 118 may derive a digital abstract of the unverified digital certificate. The digital certificate system 118 may verify if the digital abstract of the unverified digital certificate is consistent with the blockchain-stored digital abstract (to ensure that the contents of the digital certificate have not been tampered with) and if the unverified digital mark is consistent with the digital mark (to ensure that the endorsing entity is accurate). Optionally, the digital certificate system 118 may verify if the unverified entity is consistent with the blockchain-stored entity information associated with the digital certificate. If the consistency verifications succeed, the digital certificate system 118 may determine that the unverified digital certificate is authentic. If the data cannot be obtained or if any of the consistency verifications fails, the digital certificate system 118 may determine that the unverified digital certificate is unauthentic.

Figure 6A:
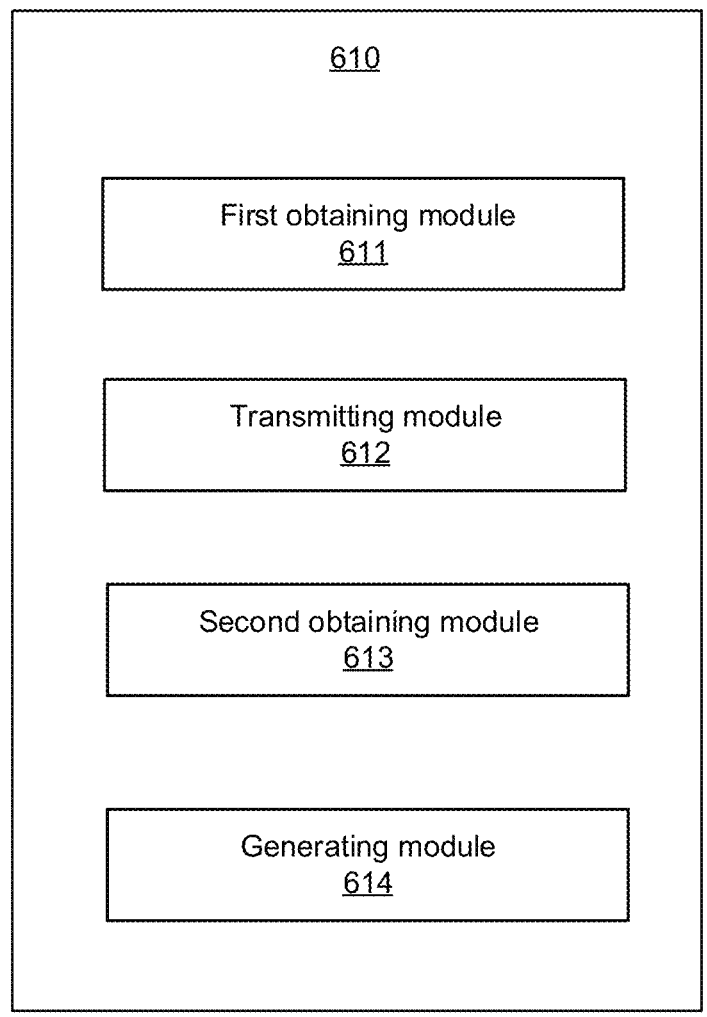
FIG. 6A illustrates a block diagram of an example of a blockchain-based digital mark generation computer system, in accordance with various embodiments.

FIG. 6A illustrates a block diagram of an example of a computer system 610 for generating blockchain-based digital mark, in accordance with various embodiments. The system 610 may be an example of an implementation of one or more components (e.g., the digital certificate system 118) of the system 110 of FIG. 1A. The method 510 may be implemented by the computer system 610. The computer system 610 may comprise one or more processors and one or more non-transitory computer-readable storage media (e.g., one or more memories) coupled to the one or more processors and configured with instructions executable by the one or more processors to cause the system or device (e.g., the processor) to perform the method 510. The computer system 610 may comprise various units/modules corresponding to the instructions (e.g., software instructions). In some embodiments, the computer system 610 may be referred to as a blockchain-based digital mark generation apparatus. The blockchain-based digital mark generation apparatus may comprise a first obtaining module 611 for obtaining entity information of an entity; a transmitting module 612 for transmitting the entity information to one or more nodes of a blockchain for storage in the blockchain; a second obtaining module 613 for obtaining a transaction identification associated with storing the entity information in the blockchain; and a generating module 614 for generating a digital mark for the entity based at least on the transaction identification.

Figure 6B:
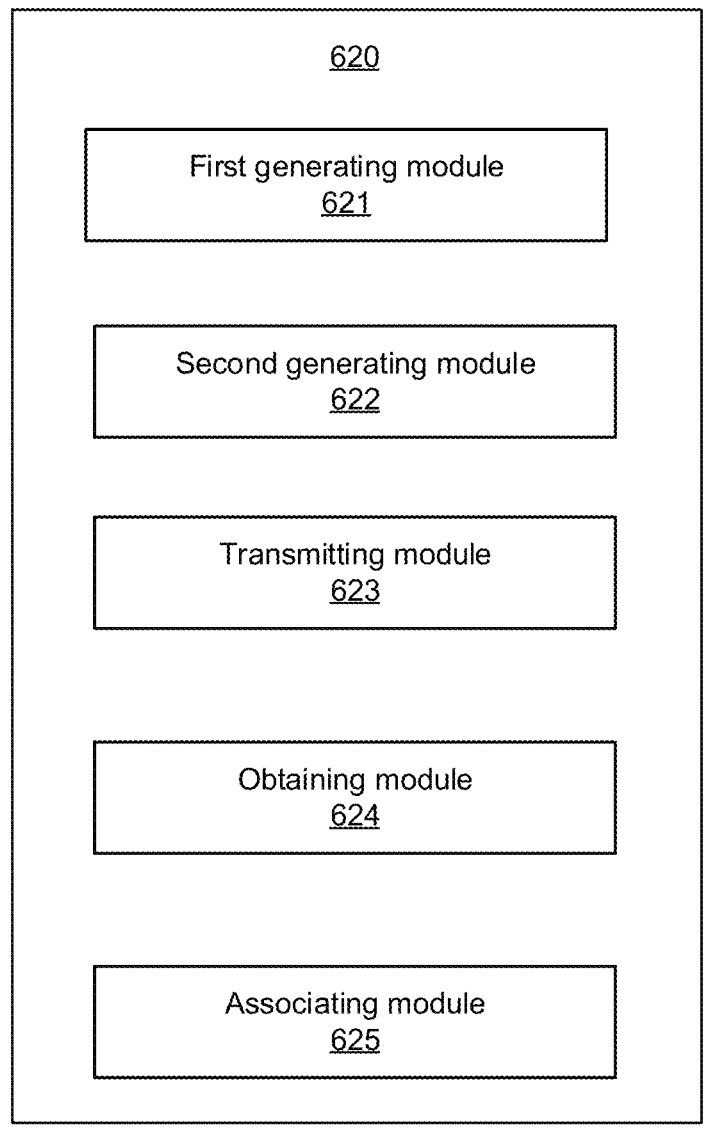
FIG. 6B illustrates a block diagram of an example of a blockchain-based digital certificate computer system, in accordance with various embodiments.

FIG. 6B illustrates a block diagram of an example of a computer system 620 for implementing blockchain-based digital certificate, in accordance with various embodiments. The system 620 may be an example of an implementation of one or more components (e.g., the digital certificate system 118) of the system 110 of FIG. 1A. The method 520 may be implemented by the computer system 620. The computer system 620 may comprise one or more processors and one or more non-transitory computer-readable storage media (e.g., one or more memories) coupled to the one or more processors and configured with instructions executable by the one or more processors to cause the system or device (e.g., the processor) to perform the method 520. The computer system 620 may comprise various units/modules corresponding to the instructions (e.g., software instructions). In some embodiments, the computer system 620 may be referred to as a blockchain-based digital certificate apparatus. The blockchain-based digital certificate apparatus may comprise a first generating module 621 for generating a digital certificate; a second generating module 622 for generating a digital abstract of the digital certificate; a transmitting module 623 for transmitting the digital abstract of the digital certificate to one or more nodes of a blockchain for storage in the blockchain; an obtaining module 624 for obtaining a transaction identification associated with storing the digital abstract of the digital certificate in the blockchain; and an associating module 625 for associating the digital mark with the transaction identification.

As shown, by obtaining a digital abstract of the digital certificate and storing the abstract in the blockchain, a representation of the original digital certificate can be securely maintained and accessible for verification. Tampering of the digital certificate can be thwarted based on the blockchain consensus rules including hashing. The digital abstract representation of the digital certificate may also hide away plaintext information to protect privacy. Further, the blockchain-stored representation of the original digital certificate is associated with the corresponding endorsing digital mark and the corresponding transaction identification storing the endorsing relationship. Through querying transaction identification, such associated information can be retrieved from the blockchain for verification. Thus, digital certificate issuance and verification can be provided with assurance of security.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof. For example, the virtual machine may include an Ethereum Virtual Machine (EVM) software that provides the runtime environment for smart contracts in Ethereum.

Figure 7:
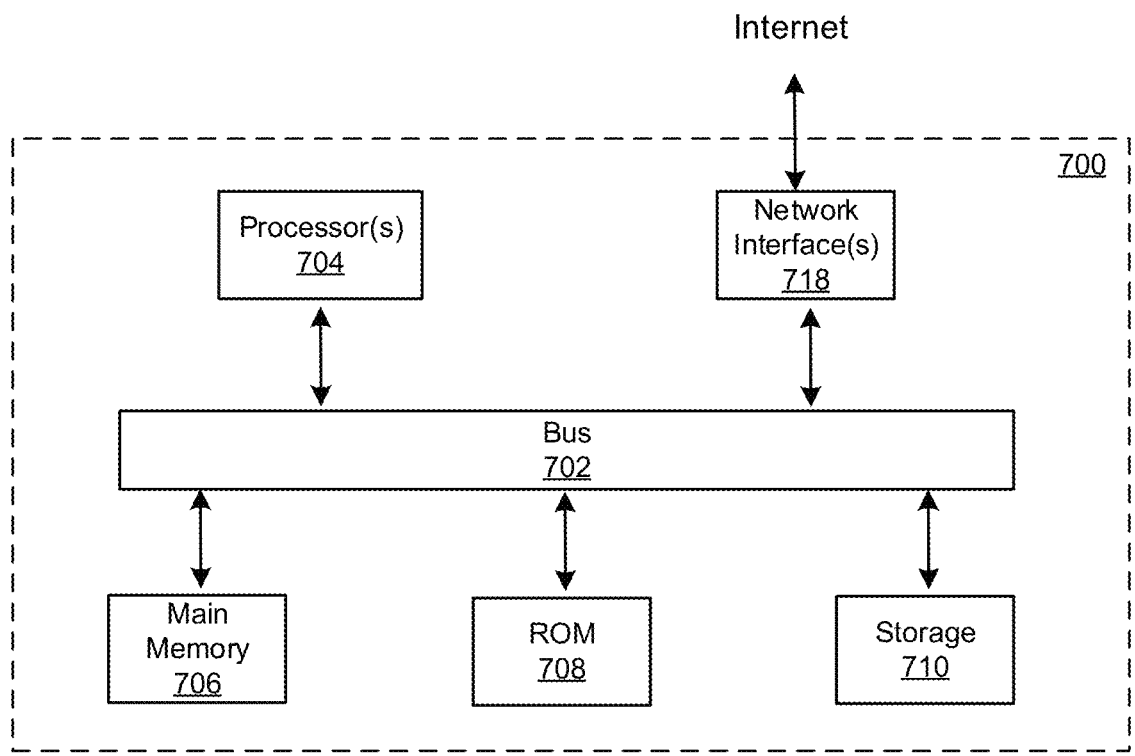
FIG. 7 illustrates a block diagram of an example of a computer system in which any of the embodiments described herein may be implemented.

FIG. 7 is a block diagram that illustrates a computer system 700 upon which any of the embodiments described herein may be implemented. The system 700 may be implemented in any of the systems and devices described herein and configured to perform corresponding steps for implementing blockchain-based digital certificate. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method for implementing digital certificates, comprising:
   generating a digital mark based on a first transaction identification of a first blockchain transaction stored to a blockchain, wherein the first blockchain transaction stores entity information of an entity to the blockchain;
   generating a digital abstract of a digital certificate according to a cryptographic process;
   storing through consensus verification to the blockchain a second blockchain transaction comprising the digital abstract of the digital certificate;
   establishing a proof of the entity's endorsement of the digital certificate by storing through consensus verification to the blockchain a third blockchain transaction comprising an association relationship between the digital mark, the digital abstract of the digital certificate, and a second transaction identification of the second blockchain transaction;
   receiving a verification request for an unverified digital certificate endorsed by an unverified digital mark of an unverified entity;
   in response to the verification request, obtaining from the blockchain the digital mark, the entity information, and the digital abstract of the digital certificate according to a third transaction identification of the third blockchain transaction;
   generating a digital abstract of the unverified digital certificate according to the cryptographic process; and
   determining whether the unverified digital certificate is authentic by verifying: (1) whether the digital abstract obtained from the blockchain is consistent with the generated digital abstract of the unverified digital certificate, (2) whether the digital mark obtained from the blockchain is consistent with the unverified digital mark, and (3) whether the entity information obtained from the blockchain is consistent with information of the unverified entity.

2. The method of claim 1, wherein:
   the digital mark comprises at least one of a digital seal or a digital signature.

3. The method of claim 1, wherein storing to the blockchain the second blockchain transaction comprises:
   writing the digital abstract of the digital certificate and information of the cryptographic process into a blockchain contract; and
   deploying the blockchain contact in the blockchain.

4. The method of claim 1, wherein:
   the digital abstract comprises a hash value of the digital certificate;
   the first transaction identification comprises a hash value of the first blockchain transaction;
   the second transaction identification comprises a hash value of the second blockchain transaction; and
   the third transaction identification comprises a hash value of the third blockchain transaction.

5. The method of claim 1, before establishing the proof of the entity's endorsement of the digital certificate, further comprising:
   creating the association relationship between the digital mark, the digital abstract of the digital certificate, and the second transaction identification of the second blockchain transaction.

6. The method of claim 1, before generating the digital abstract of the digital certificate according to the cryptographic process, further comprising:
   obtaining contents of the digital certificate from the entity; and
   generating the digital certificate comprising the contents.

7. The method of claim 1, wherein:
   the cryptographic process comprises SHA hashing.

8. The method of claim 1, further comprising:
   in response to determining that the digital abstract obtained from the blockchain is consistent with the generated digital abstract of the unverified digital certificate, the digital mark obtained from the blockchain is consistent with the unverified digital mark, and the entity information obtained from the blockchain is consistent with the information of the unverified entity, determining that the unverified digital certificate is authentic; or in response to determining that the digital abstract obtained from the blockchain is inconsistent with the generated digital abstract of the unverified digital certificate, the digital mark obtained from the blockchain is inconsistent with the unverified digital mark, or the entity information obtained from the blockchain is inconsistent with the information of the unverified entity, determining that the unverified digital certificate is unauthentic.

9. The method of claim 1, wherein:
associating the digital mark with the digital certificate indicates endorsement of the digital certificate by the entity.

10. The method of claim 1, wherein:
the blockchain comprises a consortium blockchain.

11. A digital certificate system, comprising one or more processors and one or more non-transitory computer-readable memories coupled to the one or more processors and configured with instructions executable by the one or more processors to cause the system to perform operations comprising:
generating a digital mark based on a first transaction identification of a first blockchain transaction stored to a blockchain, wherein the first blockchain transaction stores entity information of an entity to the blockchain;
generating a digital abstract of a digital certificate according to a cryptographic process;
storing through consensus verification to the blockchain a second blockchain transaction comprising the digital abstract of the digital certificate;
establishing a proof of the entity's endorsement of the digital certificate by storing through consensus verification to the blockchain a third blockchain transaction comprising an association relationship between the digital mark, the digital abstract of the digital certificate, and a second transaction identification of the second blockchain transaction;
receiving a verification request for an unverified digital certificate endorsed by an unverified digital mark of an unverified entity;
in response to the verification request, obtaining from the blockchain the digital mark, the entity information, and the digital abstract of the digital certificate according to a third transaction identification of the third blockchain transaction;
generating a digital abstract of the unverified digital certificate according to the cryptographic process; and
determining whether the unverified digital certificate is authentic by verifying: (1) whether the digital abstract obtained from the blockchain is consistent with the generated digital abstract of the unverified digital certificate, (2) whether the digital mark obtained from the blockchain is consistent with the unverified digital mark, and (3) whether the entity information obtained from the blockchain is consistent with information of the unverified entity.

12. The system of claim 11, wherein:
the digital mark comprises at least one of a digital seal or a digital signature.

13. The system of claim 11, wherein before generating the digital abstract of the digital certificate according to the cryptographic process, the operations further comprise:
obtaining contents of the digital certificate from the entity; and
generating the digital certificate comprising the contents.

14. The system of claim 11, wherein:
the cryptographic process comprises SHA hashing.

15. The system of claim 11, wherein the operations further comprise:
in response to determining that the digital abstract obtained from the blockchain is consistent with the generated digital abstract of the unverified digital certificate, the digital mark obtained from the blockchain is consistent with the unverified digital mark, and the entity information obtained from the blockchain is consistent with the information of the unverified entity, determining that the unverified digital certificate is authentic; or in response to determining that the digital abstract obtained from the blockchain is inconsistent with the generated digital abstract of the unverified digital certificate, the digital mark obtained from the blockchain is inconsistent with the unverified digital mark, or the entity information obtained from the blockchain is inconsistent with the information of the unverified entity, determining that the unverified digital certificate is unauthentic.

16. A non-transitory computer-readable storage medium configured with instructions executable by one or more processors to cause the one or more processors to perform operations comprising:
generating a digital mark based on a first transaction identification of a first blockchain transaction stored to a blockchain, wherein the first blockchain transaction stores entity information of an entity to the blockchain;
generating a digital abstract of a digital certificate according to a cryptographic process;
storing through consensus verification to the blockchain a second blockchain transaction comprising the digital abstract of the digital certificate;
establishing a proof of the entity's endorsement of the digital certificate by storing through consensus verification to the blockchain a third blockchain transaction comprising an association relationship between the digital mark, the digital abstract of the digital certificate, and a second transaction identification of the second blockchain transaction;
receiving a verification request for an unverified digital certificate endorsed by an unverified digital mark of an unverified entity;
in response to the verification request, obtaining from the blockchain the digital mark, the entity information, and the digital abstract of the digital certificate according to a third transaction identification of the third blockchain transaction;
generating a digital abstract of the unverified digital certificate according to the cryptographic process; and
determining whether the unverified digital certificate is authentic by verifying: (1) whether the digital abstract obtained from the blockchain is consistent with the generated digital abstract of the unverified digital certificate, (2) whether the digital mark obtained from the blockchain is consistent with the unverified digital mark, and (3) whether the entity information obtained from the blockchain is consistent with information of the unverified entity.

17. The storage medium of claim 16, wherein:
the digital mark comprises at least one of a digital seal or a digital signature.

18. The storage medium of claim 16, wherein before generating the digital abstract of the digital certificate according to the cryptographic process, the operations further comprise:
obtaining contents of the digital certificate from the entity; and
generating the digital certificate comprising the contents.

19. The storage medium of claim 16, wherein:
the cryptographic process comprises SHA hashing.

20. The storage medium of claim 16, wherein the operations further comprise:
in response to determining that the digital abstract obtained from the blockchain is consistent with the generated digital abstract of the unverified digital certificate, the digital mark obtained from the blockchain is consistent with the unverified digital mark, and the entity information obtained from the blockchain is consistent with the information of the unverified entity, determining that the unverified digital certificate is authentic; or
in response to determining that the digital abstract obtained from the blockchain is inconsistent with the generated digital abstract of the unverified digital certificate, the digital mark obtained from the blockchain is inconsistent with the unverified digital mark, or the entity information obtained from the blockchain is inconsistent with the information of the unverified entity, determining that the unverified digital certificate is unauthentic.

* * * * *